Feb. 6, 1923.

R. HERRMANN.
SCLEROSCOPE.
FILED JULY 28, 1920.

Inventor
Richard Herrmann
By his Attorney

Feb. 6, 1923.
R. HERRMANN.
SCLEROSCOPE.
FILED JULY 28, 1920.

Inventor
Richard Herrmann
By his Attorney

Feb. 6, 1923.

R. HERRMANN.
SCLEROSCOPE.
FILED JULY 28, 1920.

Inventor
Richard Herrmann
By his Attorney

Patented Feb. 6, 1923.

1,444,606

UNITED STATES PATENT OFFICE.

RICHARD HERRMANN, OF BERLIN, GERMANY, ASSIGNOR TO SCHUCHARDT & SCHÜTTE, OF BERLIN, GERMANY, A FIRM.

SCLEROSCOPE.

Application filed July 28, 1920. Serial No. 399,645.

*To all whom it may concern:*

Be it known that I, RICHARD HERRMANN, a citizen of the German Empire, and resident of Berlin, in the State of Prussia, German Empire, have invented new and useful Improvements in Scleroscopes of which the following is a full, clear, and exact specification.

The invention relates to a scleroscope or apparatus for testing the hardness of solid bodies, more particularly metals, by means of a falling weight.

It has already been suggested for scleroscopes to guide a dropping weight or hammer provided with a hard point, in a glass tube provided with graduations, and to return it to the top of the tube by pneumatic means into a device for catching and retaining it. Owing to the use of pneumatic means, the glass tube had to be closed up, so that its wall between the scale marked on the outside of the glass tube and the weight formed an obstacle to the exact reading of the scale. Errors in reading were likely to be caused owing to reflection or refraction.

Moreover the glass tube is very fragile. The pneumatic device used for returning the weight into the catching device, was constituted in these instruments by a rubber ball and tube. It easily became leaky, and moreover, rubber cannot always be obtained of the desired quality, and is a comparatively expensive material.

This invention relates to a scleroscope in which the weight slides in a preferably metal guide. For returning the weight to its original position a mechanical spring-operated driver is used. It is however, also possible to use a pneumatically operated device, in which however, a rubber ball and tube are preferably avoided.

The guide track for the falling weight or hammer is in the apparatus according to the invention of prismatic shape and preferably made practically three-sided and covered in the open side with glass or some other transparent material, owing to which it is prevented from becoming dirty. The hammer engages its guide only along lines, so that the engaging surfaces are kept clean by the hammer, and air can move freely past the falling hammer through the corners of the prism. In this way, the height of rebound of the hammer is increased by more than 10% compared to the older devices, and therefore the accuracy of measurements is correspondingly increased. The device returning the falling hammer to its original position is carried by means of an extension through a corner of the guide prism. so that the guide for the hammer is continuous throughout the whole of its length, and no lateral deviation of the falling hammer, which would affect the accuracy, can take place.

The release of the hammer and the operation of the returning device take place perfectly independently of each other. In that way, when the hammer is released, the comparatively powerful returning spring need not be compressed, and the releasing device can be operated by a very slight pressure of the finger, so that there is no risk of forcing the device out of its vertical position when operating it without supports.

Moreover the returning device is so constructed that when it is operated, the returning part is automatically released by a stop, after the returning spring has been compressed by the movement of a spring-controlled rod. After the return, the returning device again comes into engagement with its operating device.

In a modified construction according to the invention there is moreover provided a catching device for holding fast the falling weight or hammer when it is about to reverse its direction of movement in its uppermost position. In that way, the reading of the height of rebound is greatly facilitated. As without such a catching device the hammer remains in its uppermost position only for a moment, the reading is very difficult for inexperienced persons, and even for experienced observer it is possible only when the result of measurement is approximately known beforehand, and the reader looks at the point which will be presumably reached by the hammer in its rebound. Even then the reading is still fairly inaccurate, and the height of rebound of the hammer must therefore be made very large, in order to facilitate the reading by increasing the division of the measuring scale.

In order that the hammer may fall freely during its first downward movement, the catching device must not become operative until the hammer, after having fallen, is moving upwards, and must not interfere with the said upward movement. It has already been attempted to solve this problem by bringing the catching device which is normally in an inoperative position, into the catching position immediately after the rebound has taken place, by means of an auxiliary weight falling simultaneously with the hammer. Owing to a slightly greater height of fall of the auxiliary weight, the setting of the catching device in catching position takes place only when the hammer is already moving upwards. In order to ensure exact co-operation of the hammer with the auxiliary weight, the height of fall of the measuring hammer must be made very small, as otherwise there is liability to disturbances which affect the reliable maintaining of difference in the falling paths. The height of rebound cannot therefore be read directly on the hammer, but only with the assistance of a separate measuring device, owing to which the apparatus becomes considerably more complicated and expensive than when the height of rebound can be read direct from the position of the hammer.

According to the invention, the use of the auxiliary weight is avoided, and the catching device is brought into the catching position directly by the hammer when the latter reaches its lowermost position at the moment of rebounding, and is rendered again inoperative only when the hammer is returned by a suitable lifting device from the catching position to its original position. The arrangement is made so that any jamming or locking of the hammer during the last portion of its drop is avoided, and the rebound of the hammer is not hindered by the catching device. Owing to the hammer itself operating the catching device directly, exact working of the latter is ensured in any case, so that the height of fall of the hammer may be safely made so great that its height of rebound can be read directly on a simple scale.

Two constructions according to the invention are illustrated by way of example in the accompanying drawings.

Figures 1, 3:
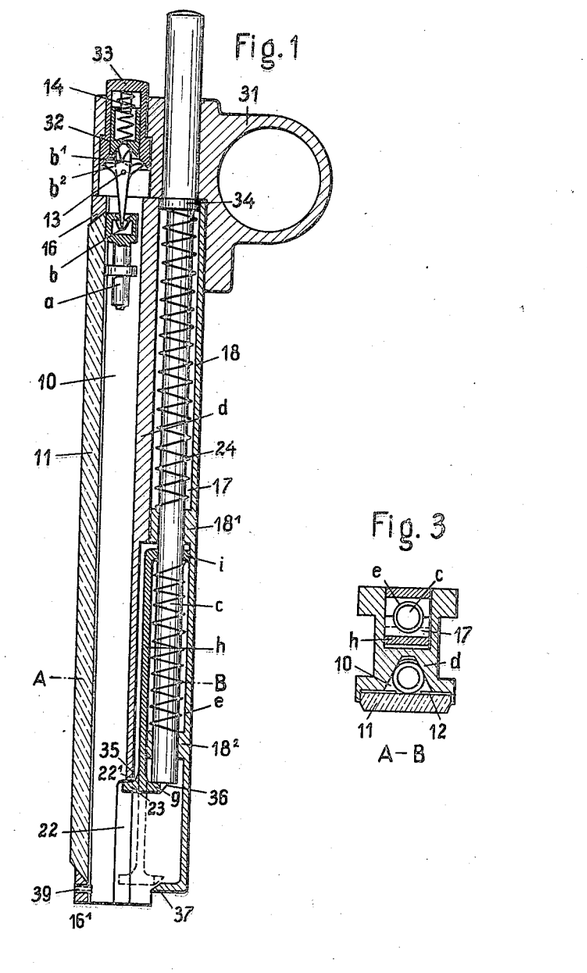
Figure 1 is a vertical longitudinal section showing one construction of the apparatus in the position of rest.
Figure 3 is a cross-section on the line A—B of Figure 1.
Figures 2, 4:
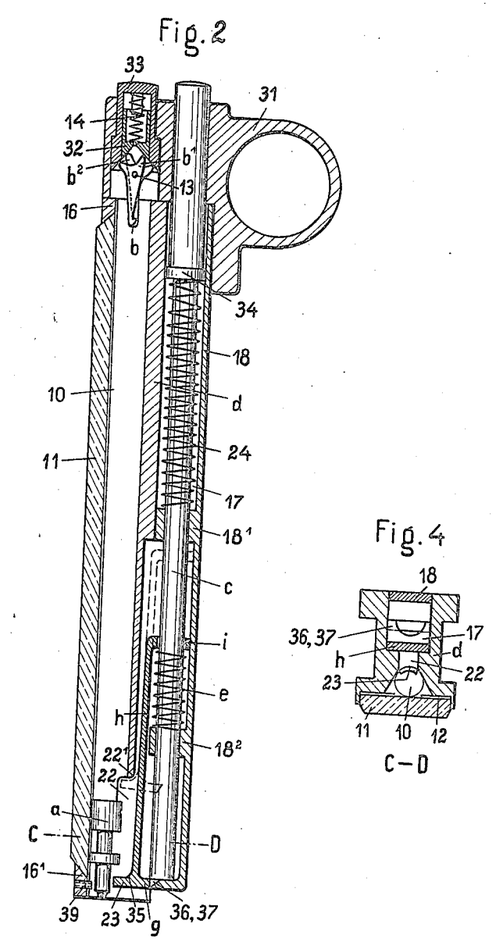
Figure 2 is a vertical longitudinal section through the apparatus at the moment of release of the returning device. The highest position of the returning device before it reaches the position of rest, is shown in dotted lines.
Figure 4 a cross-section on the line C—D of Figure 2.

In the constructions shown in Figures 1–4, in the front of the body $d$ of the apparatus is arranged a prismatic, preferably three-sided guide for the hammer $a$, which is covered in front by a strip of glass 11. The glass strip 11 is arranged in a groove of the body $d$ and held at the top and at the bottom by covering plates 16 and 16′. On the upper end of the body $d$ is mounted a head 31 in which above the guide 10 are pivoted about a pin 13 two catches or hooks $b$. The catches are provided at the top with projections $b'$ and $b^2$. Against the projections $b'$ is pressed by a spring 14 a sleeve 32 which has a hollow conical surface at the bottom. The projections $b'$ are thus moved inwards towards each other and the hooked bottom ends of the catches, which engage with a hollow space or recess of the hammer, are spread out (Figure 1). The said sleeve 32 is surrounded by a pressure sleeve 33 which is adjustably mounted in the head 31. It is pressed upwards by the action of the spring 14 until its projection engages with a corresponding projection of the bore. The pressure sleeve 33 has at the bottom an also hollow conical surface with which the catches $b$ engage with their lateral projections $b^2$. If the sleeve 33 is pressed downwards in opposition to the action of the spring 14, its hollow conical surface will move the catches in the direction opposite to that in which they are moved by the sleeve 32, and the hooked bottom ends of the catches are moved towards each other, until their hook-shaped ends are disengaged from the hammer so that the latter is released and drops (Figure 2).

In the head 31 is guided also the upper end of the rod $c$ operating the returning device. Its lower thin end engages with the groove 17 in the rear part of the body $d$. It is moved upwards by the spring 24 until it strikes by means of a collar 34 against the bottom surface of the head 31.

The bottom end of the pressure rod $c$ which is guided in the projections $18'$ and $18^2$ of the rear covering plate 18 of the apparatus, rests on a projection $g$ at the lower end of the returning device $h$ which at its upper end is provided with an annular projection $i$ which loosely surrounds the rod $c$. Between the said annular projection and the projection $18^2$ of the rear covering plate is arranged the returning spring $e$. It presses the returning device upwards so that it strikes with a cam face 35 the upper edge $22'$ of the slot 22 through which the returning device presses into the hammer guide. In this way the projection $g$ of the returning member is held fast under the rod $c$. The projection $g$ of the returning member is also provided with a cam face 36, and a further cam face 37 is arranged on a projection at the bottom end of the rear covering plate 18.

The operation of the apparatus is as follows:

On the rod $c$ being depressed, it acts on the projection $g$ of the returning device and drives the latter down, the spring $e$ between the projection $i$ and the projection $18^2$ being compressed. As soon as the cam face 36 of the projection $g$ strikes the cam face 37, these two faces slide on each other, and the bottom end of the returning device is forced aside, transversely to its direction of movement, and through the slot 22 into the path of the hammer, until the projection 23 of the returning device engages under the hammer, and the projection $g$ slides off the lower end of the rod $c$ and thus becomes free (Figure 2). The returning device is then projected upwardly, by the expanding spring $e$ and slides along the rod $c$. In this way, during the whole of the upward movement, the driver 23 of the returning device is positively guided in the guide of the hammer $a$ and drives the latter upwardly. As the rear face of the projection $g$ engages with the rod $c$, the lower end of the returning device at first remains in the position in which the driver 23 projects into the path of fall of the hammer. On the rod $c$ being then released, it is again raised by the spring 24 until the collar 34 engages with the head 31. In that way the projection $g$ of the returning device is released by the lower end of the rod $c$, so that the spring $e$ forces the returning device still further upwards. The cam face 35 slides during that movement on the edge $22'$, owing to which the returning device is sent back again to the position of rest in which the projection $g$ engages under the lower end of the rod $c$.

The returning device is now outside the path of the hammer $a$ and the apparatus is ready to be used again.

It will be seen that in this construction the hammer can be easily removed from the guide after removing a stop pin 39 which is intended to prevent it accidentally falling out.

A second construction according to the invention is shown in Figures 5–14 in which the parts corresponding to those of the apparatus according to Figures 1–4, are marked with the same reference signs.

Figure 5:
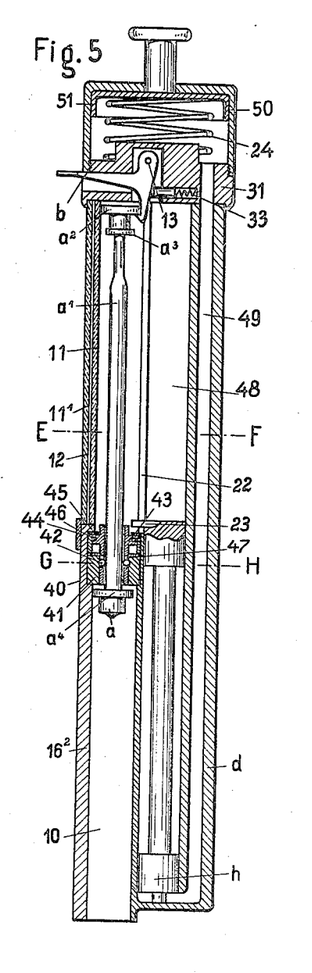
Figure 5 shows a second construction of the apparatus in the normal position, in longitudinal section.
Figure 6:
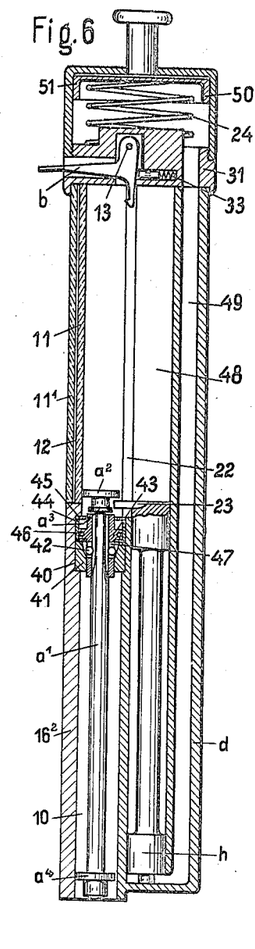
Figure 6 shows the apparatus in longitudinal section at the moment when the hammer strikes the piece to be tested.
Figure 7:
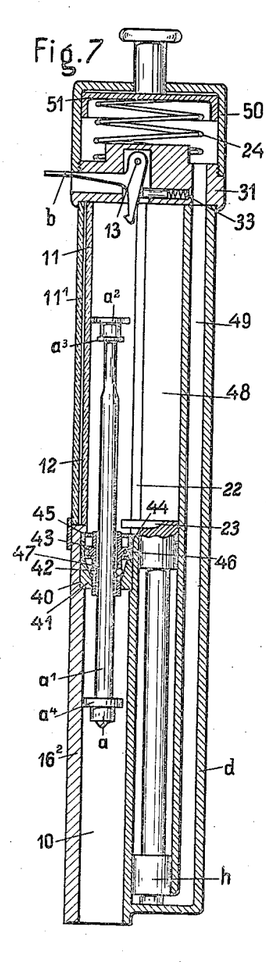
Figure 7 shows the hammer in the catching position, in longitudinal section through the apparatus.

In this construction, as in that already described, the falling hammer $a$ moves up and down in the guide body $d$ in the practically three-sided guide 10, without any material friction. The upper part of the guide 10 is closed in front by a glass plate 11. Between the latter and a second glass plate $11'$ are arranged the scales 12 which leave between them a free slot through which the position of the hammer may be seen. The bottom part of the guide 10 is closed in front by a cover plate $16^2$.

Figure 12:
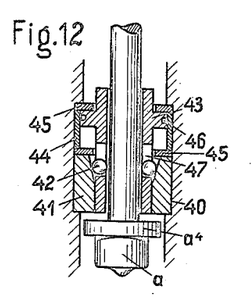
Figures 12–14 show on an enlarged scale various positions of the apparatus.

The cylindrical rod $a'$ of the hammer is surrounded by a retaining device which is prevented from moving in the axial direction by recesses 40 in the body $d$ and in the covering plate $16^2$. This retaining device comprises a sleeve 41 with a conical bore. Between the said sleeve 41 and the hammer rod $a^1$ are arranged balls 42 which prevent any downward movement of the hammer when they are situated between the conical surfaces of the sleeve 41 and the hammer rod $a'$, but allow on the contrary of a free upward movement of the hammer. To enable the hammer to fall freely, the balls 42 are raised until they no longer touch simultaneously the conical surface of the sleeve 41 and the rod $a'$ of the hammer $a$. To that end, the balls 42 are held in a cage 43 which is guided in the lower part of the sleeve 41 and in a sleeve 44. Its movement is limited by two stop rings 45 with which engages, in the two end positions, a guide collar. An annular brake spring 46 prevents it from moving down by gravity. When the ball cage is pushed upwards, the balls 42 rest on the lower edges of the transverse bores of the ball cage, the balls are loose between the sleeve 41 and the rod $a'$ of the hammer $a$, and the latter is able to move freely downwards (Figure 12). If on the contrary the ball cage is pushed down, the balls 42 can freely fall down until they engage both with the conical surface of the sleeve 41 and the hammer rod $a'$, and prevent the hammer $a$ from moving down.

Behind the guide 10 there is provided in the body $d$ a cylindrical bore 48 in which travels an air-tight piston, $h$. It projects by means of a driver 23, through the slot 22 in the body $d$, into the guide 10 of the hammer and engages under the upper guide disc $a^2$ of the latter. The space below the piston $h$ is connected through a conduit 49 to a cylinder 50. In the latter moves an air-tight piston 51 which, in its position of rest, is pressed up by a helical spring 24. In the plate 31 which closes the cylinder 50 at the bottom, is pivoted about a pin 13, a catch or hook $b$ the bottom hook-shaped end of which is moved by a spring 33 towards the guide track of the hammer.

Figure 8:
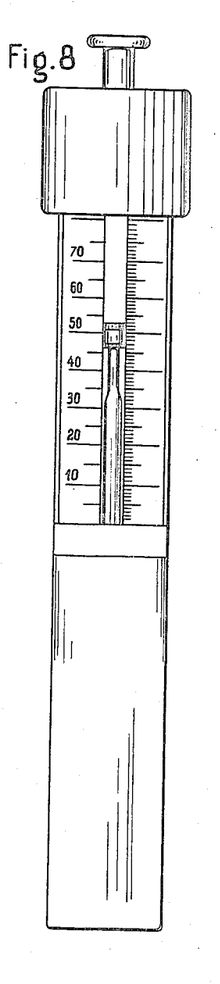
Figure 8 is a front elevation of the apparatus, the hammer indicating the hardness 52.5.
Figure 13:
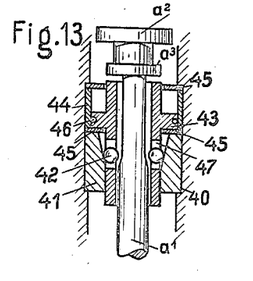
Figure 14:
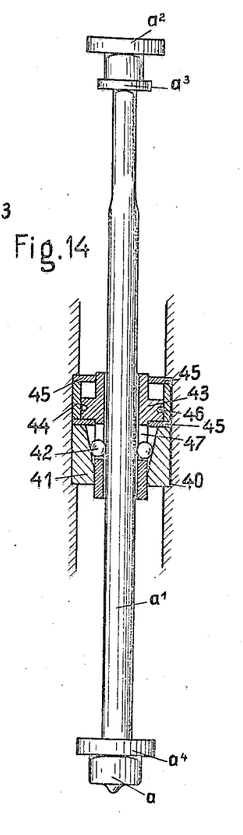

In its position of rest (Figure 5) the hammer $a$ is suspended with its upper guide disc $a^2$ on the catching hook $b$. On the front end of the hook being depressed, it is disengaged from the hammer, and the latter falls freely, as the ball cage 43 is at first in its upper position, the position of rest. Immediately before the hammer strikes the test piece, its central guide disc $a^3$ strikes the upper end of the ball cage 43 and pushes it downwards into its jammed or locking position (Figure 13). The rod $a^1$ of the hammer $a$ is reduced under the central guide disc $a^3$ to such an extent that the balls at this point are loose even when the ball cage is pulled down, and do not lock the hammer during the rest of its downward movement. The hammer then strikes the test piece and rebounds to a certain height which depends on the hardness of the test piece, to be measured. During the said upward movement of the hammer, the balls slide along its rod, without materially interfering with its movement. As soon however as the hammer $a$ has reached its highest position and is about to change the direction of its movement, they are driven downwards and tightened. The hammer $a$ is thus instantaneously stopped, and its height of rebound can now be read from the position of its uppermost guide disc $a^2$ on the scale 12 (Figure 8).

Figure 9:
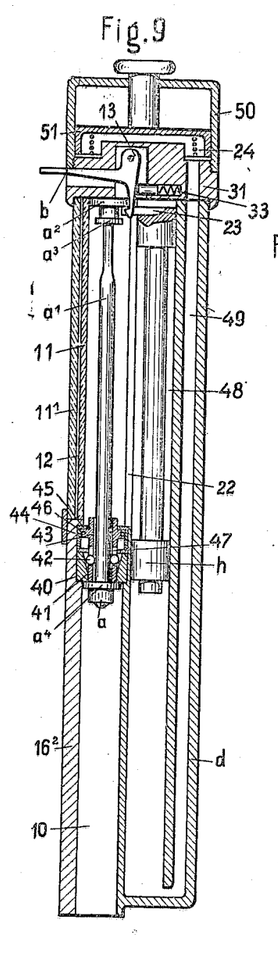
Figure 9 is a longitudinal section showing the apparatus when the hammer is returned to its starting position by the lifting device.
Figure 10:
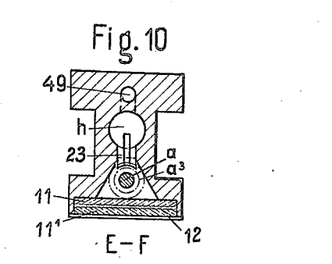
Figure 10 is a cross-section on the line E—F of Figure 5.
Figure 11:
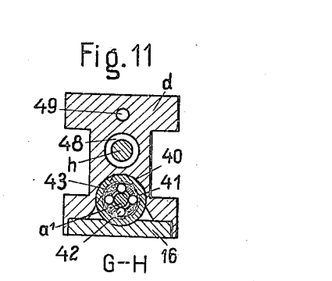
Figure 11 is a cross-section on the line G—H of Figure 5.

In order to return the hammer to its original position, the piston 51 is depressed in the cylinder 50. The air under the piston 51 is thereby compressed and passes through a conduit 49 under the lifting piston $h$ which is thus moved upwards and by means of the driver 23 raises the hammer $a$ until the hook $b$ again engages under the upper guide disc of the hammer $a$. On the piston 51 being again released, it is returned to its position of rest by the spring 24. In that way a vacuum is produced under the piston $h$, which, with the co-operation of the weight of the piston again moves it down, into its position of rest. The hammer $a$ is held fast by the hook $b$ in its highest, i. e. starting, position. When the hammer $a$ is moved upwards by the driver 23, its lower disc $a^4$ strikes the bottom face of the ball cage 43 and raises the latter again into its upper position (Figure 9).

The apparatus is then ready for use again.

The essential point is always that the catching device should be brought into the operative position only by the falling hammer itself, and that during the return of the hammer to its starting position, it should be brought again into the inoperative position, so that it no longer hinders free falling and rebound of the hammer, but on the contrary holds it fast at the moment of the reversal of its direction of movement, after it has reached its greatest height of rebound.

Instead of the pneumatic returning device described for the construction in Figures 5-14, a device operated by spring power may of course be used. In the same way, conversely, in the construction in Figures 1-4, a pneumatic returning device similar to that described in the foregoing may be used. Of course, in place of the cylinder 50 and piston 51, the known pneumatic devices with a rubber ball may also be used.

What I claim is:—

1. In a scleroscope: the combination with a gravity actuated hammer; of a slotted prismatic guide therefor, closed at the open side by a strip of transparent material; and a driver device adapted to return the hammer to its starting position, the driver being carried through a corner of the prismatic guide in manner such that a slot of said guide, intended for its passage, does not extend into the line of contact of the guide with the hammer.

2. In a scleroscope: the combination with a gravity actuated hammer; of a prismatic guide therefor, said guide being substantially three-sided, slotted as and for the purpose set forth and closed at the open side by a strip of transparent material; and a driver device adapted to return the hammer to its starting position, the driver being carried through a corner of the prismatic guide in manner such that a slot of said guide, intended for its passage, does not extend into the line of contact of the guide with the hammer.

3. In a scleroscope: the combination with a gravity actuated hammer; of a releasing device therefor; and a returning device operable independently of said releasing device and adapted to positively engage with the hammer to return same.

4. In a scleroscope: the combination with a gravity actuated hammer; of a device to engage the hammer for returning same; a catching device holding fast the hammer in its highest position reached in the rebound from a test piece; and means carried by the hammer to set the catching device in the downward travel of the hammer.

5. In a scleroscope: the combination with a gravity actuated hammer; of a device to engage the hammer for returning same; a catching device holding fast the hammer in its highest position reached in the rebound from a test piece; and means carried by the hammer to set the catching device in the downward travel of the hammer, said hammer passing freely thru the catching device in its downward travel.

6. In a scleroscope: the combination with a gravity actuated hammer and upper and lower engaging means thereon; of a returning device for the hammer; and a catching device for holding the hammer in its highest position reached in the rebound from the test piece and including a movable member adapted to be engaged by the upper engaging means of the hammer, as the latter reaches its lowest position, to set said catching device, the lower engaging means of the hammer in the highest position of the said hammer engaging the said movable member to restore it to normal position.

7. In a scleroscope: a gravity actuated hamer having a rod portion; means for holding the rod in inoperative position; a releasing device therefor; a reciprocable ball cage through which said rod passes; balls retained thereby for locking the rod; and means on the rod for engaging the ball cage.

8. In a scleroscope: the combination with a gravity actuated hammer; and a releasing device for the hammer; of a returning device; and a catching device to hold the hammer in its highest position reached in the rebound from a test piece, and comprising a reciprocable ball cage and balls for holding the hammer, and a sleeve member having inclined surfaces to cooperate with the balls in releasing and locking the hammer.

9. In a scleroscope: a gravity actuated hammer having a rod portion of reduced thickness at its upper end, means for holding the rod in inoperative position; a releasing device therefor; a reciprocable ball cage through which said rod passes; balls retained thereby for locking said rod; and means on said rod to set the ball cage into locking position.

10. In a scleroscope: a gravity actuated hammer having a rod portion; means for holding the rod in inoperative position; a releasing device therefor; a reciprocable ball cage through which said rod passes; balls retained thereby for locking the rod; means on said rod to set the ball cage into locking position; and additional means on the rod for restoring the ball cage to a position of rest.

11. In a scleroscope: a gravity actuated hammer having a rod portion; means for holding the rod in inoperative position; a releasing device therefor; a reciprocable ball cage through which the rod passes; balls retained thereby for locking the rod; and upper and lower disks on said rod upon opposite sides of the ball cage adapted to engage with same to respectively set the ball cage into locking position and to restore the same to a position of rest.

12. In a scleroscope: the combination with a gravity actuated hammer; of a pneumatic returning device for the hammer and adapted to positively engage same; and a catching device for holding fast the hammer in its highest position reached in the rebound from a test piece.

13. In a scleroscope: the combination with a gravity actuated hammer; of a returning device for same and comprising a piston having a projection engaging the hammer, and means for supplying air under pressure to the piston to actuate same.

In testimony, that I claim the foregoing as my invention, I have signed my name in presence of two subscribing witnesses.

RICHARD HERRMANN.

Witnesses:
 WALTER HILDEBRANDT,
 NATHAN ACKERHART.